No. 622,597. Patented Apr. 4, 1899.
J. C. BOWERS.
THILL COUPLING.
(Application filed Jan. 15, 1898.)
(No Model.)
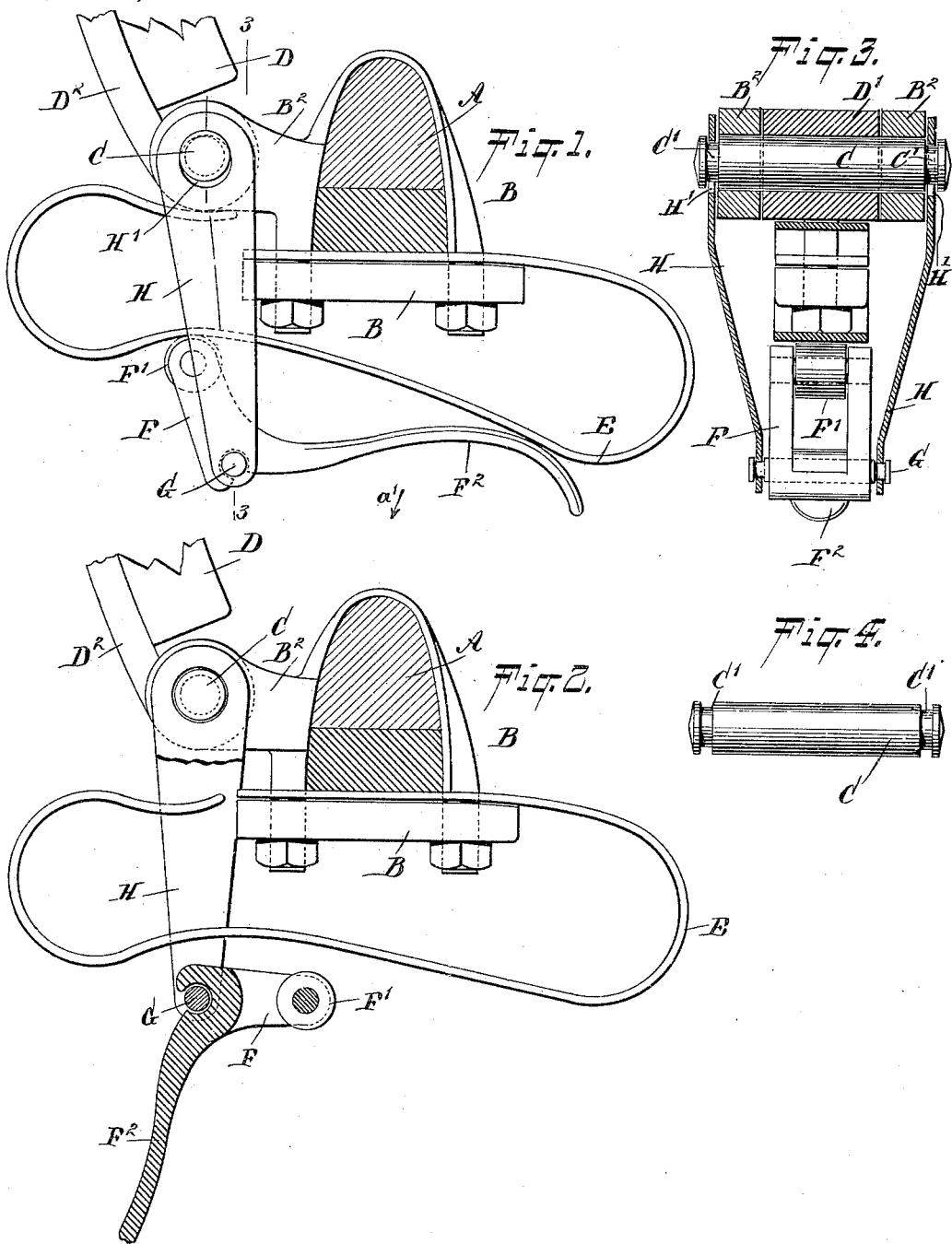
WITNESSES:
William P. Gaebel
Rev. J. Hosto
INVENTOR
J. C. Bowers
BY
Munn
ATTORNEYS.

United States Patent Office.

JOHN CHARLES BOWERS, OF NEW YORK, N. Y.

THILL-COUPLING.

SPECIFICATION forming part of Letters Patent No. 622,597, dated April 4, 1899.

Application filed January 15, 1898. Serial No. 666,779. (No model.)

*To all whom it may concern:*

Be it known that I, JOHN CHARLES BOWERS, of New York, borough of Brooklyn, county of Kings, in the State of New York, have invented new and useful Improvements in Thill-Couplings, of which the following is a full, clear, and exact description.

The object of the invention is to provide certain new and useful improvements in thill-couplings whereby all rattling is obviated and the coupling pin or bolt is securely locked in position while the device is in use, but can be readily unlocked for removal when changing from a shaft to a pole, or vice versa.

The invention consists of novel features and parts and combinations of the same, as will be described hereinafter, and pointed out in the claim.

Reference is to be had to the accompanying drawings, forming a part of this specification, in which similar characters of reference indicate corresponding parts in all the figures.

Figure 1 is a side elevation of the improvement as applied and with the axle shown in section. Fig. 2 is a similar view of the same with parts in section and with the spring released from the eye of the thill-coupling. Fig. 3 is a transverse section of the improvement on the line 3 3 of Fig. 1, and Fig. 4 is a side elevation of the coupling-pin.

On the axle A is secured the usual clip B, formed with a tie-bar and lugs $B^2$, forming bearings for a coupling pin or bolt C, engaged by the eye $D'$ of a thill-iron $D^2$, forming part of a thill D of the usual construction. The eye $D'$ extends between the lugs $B^2$ and is adapted to be engaged and pressed on by the free end of a thill-spring E, secured at its other end to the clip B and axle A, as is plainly indicated in the drawings.

The spring E, as shown in Fig. 2, is out of contact with the eye $D'$ when it is desired to change from a pole to a shaft, or vice versa, and in order to move the free end in engagement with the said eye $D'$, I provide the following device: On the under side of the spring E, between its attaching point and its free end, bears a friction-roller $F'$, journaled in the free end of an arm of a bell-crank lever F, having its other arm $F^2$, in the shape of a handle, under the control of the operator and adapted to rest normally against the under side of the spring E, as is plainly shown in Fig. 1. This bell-crank lever F is fulcrumed on a pin G, held at its ends in links H, formed with apertures $H'$ for engaging the projecting ends of the coupling bolt or pin C, the latter being provided at the projecting ends with annular recesses or grooves $C'$ to permit the top portions of the links to drop into said grooves and securely lock the pole C against transverse movement.

Now when the bell-crank lever F is in the position shown in Fig. 1 its friction-roller $F'$ in bearing against the spring E presses the free end thereof in firm contact with the eye $D'$ of the thill D to prevent rattling of the eye $D'$ and the bolt C, and at the same time a pressure is exerted in a downward direction on the links H, so that they are securely held in position in the recesses $C'$ to prevent accidental displacement of the coupling-bolt C in its bearings and the lugs $B^2$. It is understood that the bell-crank lever F has the arm carrying the friction-roller $F'$ arranged in such a manner that when the spring E is in an inactive position it bears almost in a straight line downward through the bell-crank-lever arm on the links H to securely hold the same in place.

When it is desired to relieve the eye $D'$ of the spring E, the operator throws the handle $F^2$ downward and forward in the direction of the arrow $a'$ to bring the bell-crank lever into the position shown in Fig. 2—that is, to disengage the friction-roller $F'$ from the spring, whereby the latter by its own resiliency moves with its free end out of engagement with the eye $D'$. When the parts are in this position, the operator can readily lift the links H upward to bring their openings $H'$ concentric with the coupling-bolt C, so that the latter may be moved transversely out of its bearings and the eye $D'$ for the removal of the thill from the coupling.

Having thus fully described my invention, I claim as new and desire to secure by Letters Patent—

In a thill-coupling the combination of an axle-clip having a bearing, a coupling-pin held thereby, a thill-iron having an eye engaging the coupling-pin, links hung from the
5 ends of the coupling-pin, a spring held by the clip and capable of engaging the eye of the thill-iron to hold the same in place, and a bell-crank lever fulcrumed between the links and pressing the spring to hold the same engaged with the eye of the thill-iron.

JOHN CHARLES BOWERS.

Witnesses:
   THEO. G. HOSTER,
   EVERARD BOLTON MARSHALL.